(12) United States Patent
Sora

(10) Patent No.: US 12,398,803 B2
(45) Date of Patent: Aug. 26, 2025

(54) POWER TRANSMISSION DEVICE

(71) Applicant: HONDA MOTOR CO., LTD., Tokyo (JP)

(72) Inventor: Masaru Sora, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/797,167

(22) Filed: Aug. 7, 2024

(65) Prior Publication Data

US 2025/0052319 A1  Feb. 13, 2025

(30) Foreign Application Priority Data

Aug. 7, 2023  (JP) ................................ 2023-128807

(51) Int. Cl.
*F16H 63/34* (2006.01)
*F16H 55/36* (2006.01)

(52) U.S. Cl.
CPC ......... *F16H 63/3425* (2013.01); *F16H 55/36* (2013.01)

(58) Field of Classification Search
CPC ............... B62M 9/16; B62M 11/14–18; F16H 37/04–041; F16H 63/34–3425
See application file for complete search history.

(56) References Cited

U.S. PATENT DOCUMENTS

| | | | | |
|---|---|---|---|---|
| 6,106,428 A | * | 8/2000 | Koneda | F16H 37/022 475/210 |
| 11,192,436 B1 | * | 12/2021 | Puiu | B60K 17/16 |
| 2005/0205384 A1 | * | 9/2005 | Reed | F16H 57/031 192/219.5 |
| 2006/0070839 A1 | * | 4/2006 | Sugano | F16H 63/3416 192/219.5 |
| 2012/0145512 A1 | * | 6/2012 | Kim | F16H 63/3425 192/219.5 |
| 2022/0205534 A1 | * | 6/2022 | Morise | F16H 63/3466 |
| 2023/0204102 A1 | * | 6/2023 | Matsuo | F16H 63/3425 192/219.5 |

FOREIGN PATENT DOCUMENTS

| | | | | |
|---|---|---|---|---|
| JP | H10-148241 A | | 6/1998 | |
| KR | 20220169297 A | * | 12/2022 | ............. F16H 63/38 |

* cited by examiner

*Primary Examiner* — Stacey A Fluhart
*Assistant Examiner* — Lillian T Nguyen
(74) *Attorney, Agent, or Firm* — Paratus Law Group, PLLC

(57) ABSTRACT

A power transmission device includes: a drive source; a transmission portion configured to convert power of the drive source and transmit the power to a driven portion; and a case accommodating the drive source and the transmission portion, in which the power transmission device further comprises a drive sprocket disposed at an output shaft of the drive source, a driven sprocket disposed on the same plane as the drive sprocket, an endless flexible member wound around the drive sprocket and the driven sprocket, and a parking gear disposed at the output shaft of the drive source.

4 Claims, 10 Drawing Sheets

POWER TRANSMISSION DEVICE

CROSS-REFERENCE TO RELATED APPLICATIONS

This application is based on and claims priority under 35 USC 119 from Japanese Patent Application No. 2023-128807 filed on Aug. 7, 2023, the entire content of which is incorporated herein by reference.

TECHNICAL FIELD

The present invention relates to a power transmission device.

BACKGROUND ART

In related art, there has been known a power transmission device including a transmission portion in which an endless flexible member such as a chain or a belt is wound around a drive sprocket and a driven sprocket, and power is transmitted via the endless flexible member. In such a power transmission device, it is necessary to set a parking mechanism so as to avoid a trajectory of the endless flexible member.

For example, in a remote video pan-tilt mechanism disclosed in JPH10-148241A, a mechanism is disposed inside a chain belt. The mechanism includes a first gear constantly meshed with a sprocket and a second gear constantly meshed with the first gear, and the second gear is meshed with the sprocket while the first gear and the second gear are meshed with each other to interlock and stop drive.

For example, a power transmission device used in an electric vehicle or the like is desired to be reduced in size in order to ensure as much space in a passenger compartment as possible. Therefore, a degree of freedom in arrangement of a parking mechanism is required.

An object of the present invention is to provide a power transmission device with a high degree of freedom in layout.

SUMMARY OF INVENTION

According to an aspect of the present invention, there is provided a power transmission device including:
a drive source;
a transmission portion configured to convert power of the drive source and transmit the power to a driven portion; and
a case accommodating the drive source and the transmission portion, in which
the power transmission device further includes
a drive sprocket disposed at an output shaft of the drive source,
a driven sprocket disposed on the same plane as the drive sprocket,
an endless flexible member wound around the drive sprocket and the driven sprocket, and
a parking gear disposed at the output shaft of the drive source.

DESCRIPTION OF EMBODIMENTS

Figure 1:
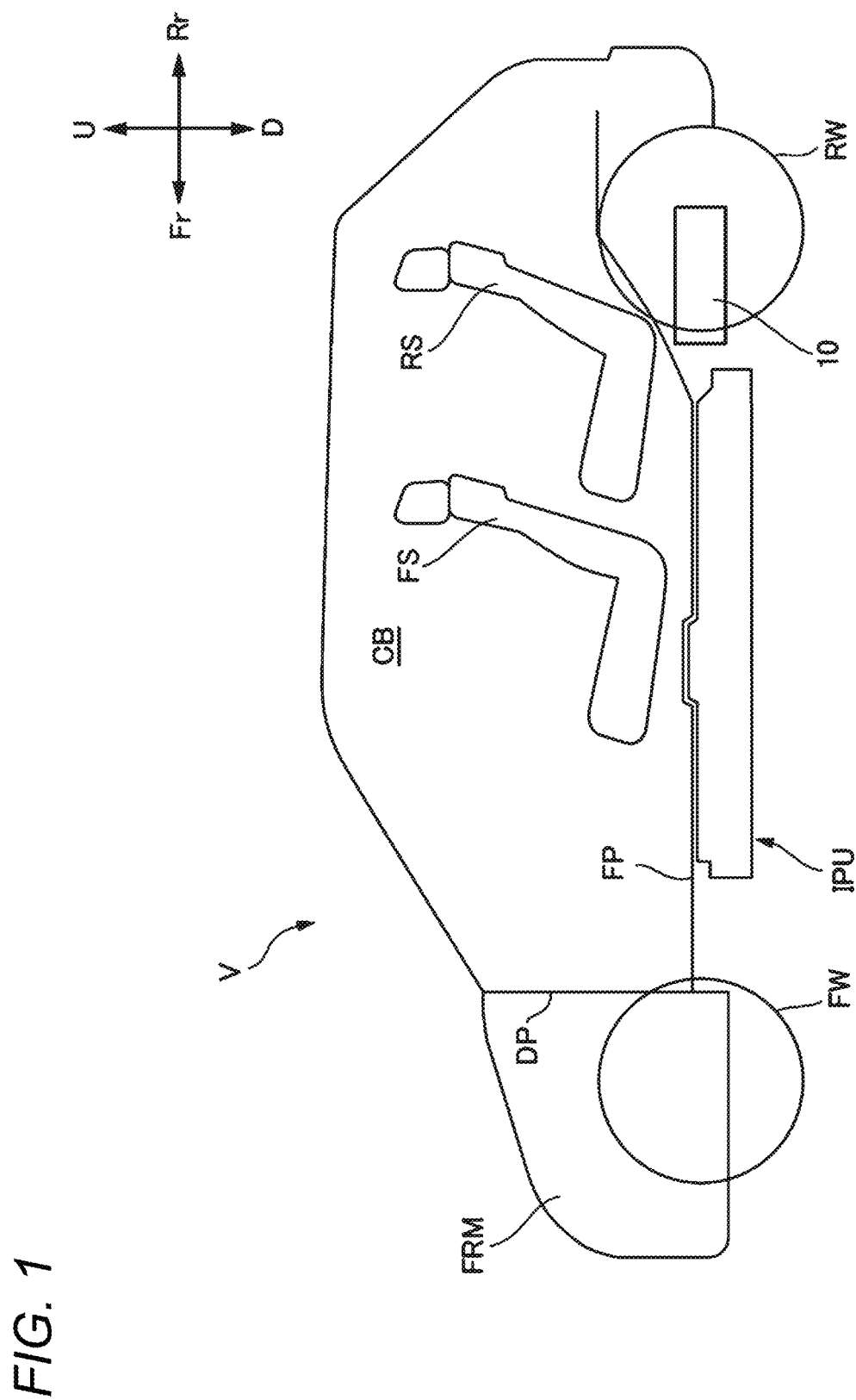
FIG. 1 is a schematic view of a vehicle on which a drive unit 10 according to an embodiment of the present invention is mounted as viewed from a left side.

Hereinafter, a vehicle on which a drive unit according to an embodiment of the present invention will be described with reference to the accompanying drawings. The drawings are viewed in directions of reference numerals. In the present specification and the like, in order to simplify and clarify the description, a front-rear direction, a left-right direction, and an upper-lower direction are described according to directions viewed from a driver of the vehicle, and in the drawings, a front side of the vehicle is shown as Fr, a rear side is shown as Rr, a left side is shown as L, a right side is shown as R, an upper side is shown as U, and a lower side is shown as D.

[Overall Configuration of Vehicle]

As shown in FIG. 1, a vehicle V according to the present embodiment includes a pair of left and right front wheels FW, a pair of left and right rear wheels RW, and a floor panel FP constituting a floor of the vehicle V. The vehicle V is partitioned, by a dash panel DP extending in the upper-lower direction above the floor panel FP, into a passenger compartment CB and a front room FRM in front of the passenger compartment CB. A front seat FS and a rear seat RS are provided in the passenger compartment CB.

The vehicle V includes a drive unit 10 serving as a drive source, and a battery pack IPU that stores electric power to be supplied to the drive unit 10.

The drive unit 10 is disposed behind the rear seat RS and below the floor panel FP. The battery pack IPU is disposed below the floor panel FP and below a floor of the passenger compartment CB. The battery pack IPU accommodates a plurality of battery modules in which a plurality of battery cells are stacked. Each battery cell is a secondary battery that can be charged and discharged, such as a lithium ion battery or an all-solid-state battery.

[Overall Configuration of Drive Unit]

Figure 2:
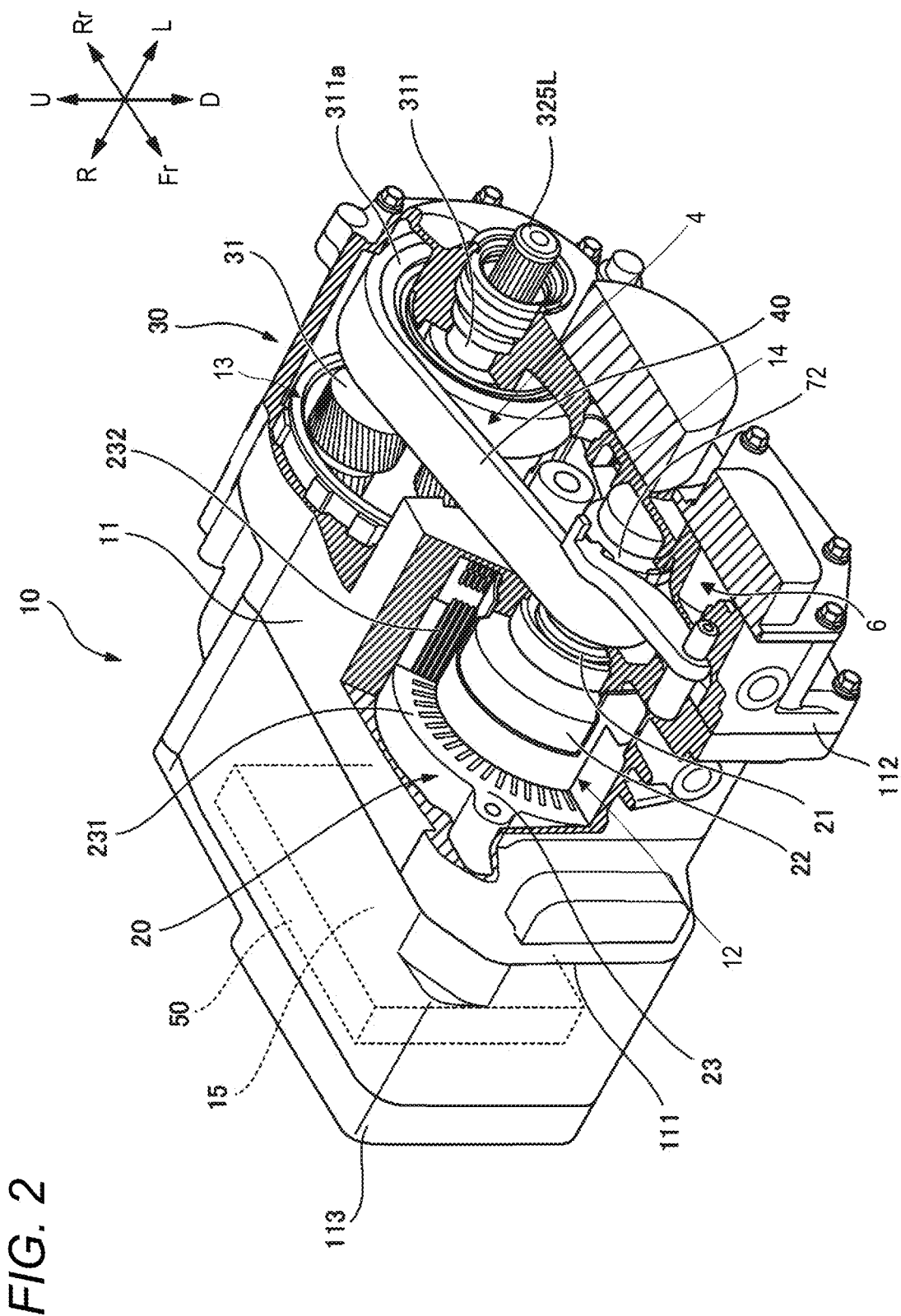
FIG. 2 is a cutaway perspective view of a part of the drive unit 10 of the embodiment of the present invention.
Figure 3:
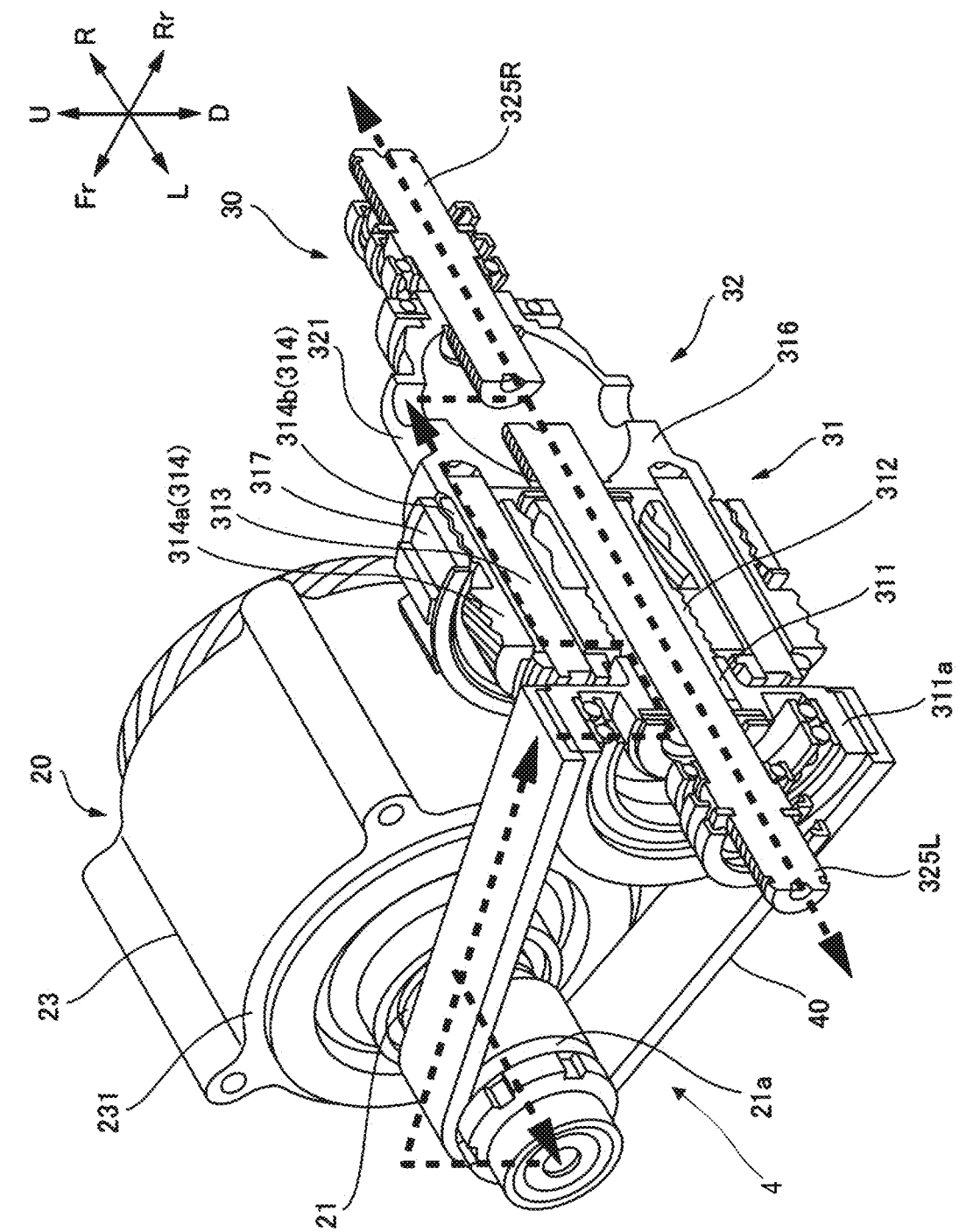
FIG. 3 is a partial cross-sectional perspective view showing a power transmission path in the drive unit 10 in FIG. 2.

As shown in FIGS. 2 and 3, the drive unit 10 includes a drive motor 20, a deceleration device 30 that reduces power output from the drive motor 20 and outputs the reduced power to the outside, a chain transmission mechanism 4 that transmits the power output from the drive motor 20 to the deceleration device 30, a control device 50 that controls the drive motor 20, a parking mechanism 6, and a drive unit case 11 that accommodates the above-described components.

The drive unit case 11 includes a main case 111, a left side cover 112 covering a left side surface of the main case 111, and a right side cover 113 covering a right side surface of the main case 111.

The drive unit case 11 includes a motor chamber 12 that accommodates the drive motor 20, a gear chamber 13 that accommodates the deceleration device 30, a chain chamber 14 that accommodates the chain transmission mechanism 4 and the parking mechanism 6, and a controller chamber 15 that accommodates the control device 50. The motor chamber 12 and the gear chamber 13 are formed side by side in the front-rear direction such that the motor chamber 12 is located on the front side and the gear chamber 13 is located on the rear side. The chain chamber 14 is formed on the left side of the motor chamber 12 and the gear chamber 13 and is formed by the main case 111 and the left side cover 112. The controller chamber 15 is formed on the right side of the motor chamber 12 and the gear chamber 13 and is formed by the main case 111 and the right side cover 113.

The drive motor 20 is a so-called inner rotor motor that includes a drive shaft 21, a rotor 22 that is attached to the drive shaft 21 and rotates integrally with the drive shaft 21, and a stator 23 that is disposed on a radial direction outer side of the rotor 22 in a manner of facing the rotor 22 in the radial direction with a slight gap therebetween.

In the present embodiment, in the drive unit 10, the drive motor 20 is disposed such that an axial direction (that is, the drive shaft 21) is horizontally oriented in the left-right direction. In this way, since the drive shaft 21 is oriented in the horizontal direction, an upper-lower dimension of the drive unit 10 can be compact.

The stator 23 includes a stator core 231 and a coil 232 that is attached to the stator core 231 and includes a plurality of windings of a U-phase, a V-phase, and a W-phase.

A drive sprocket 21a around which a power transmission chain 40 of the chain transmission mechanism 4 is wound is attached to a left end of the drive shaft 21. The drive sprocket 21a rotates integrally with the drive shaft 21.

The chain transmission mechanism 4 includes the drive sprocket 21a attached to the drive shaft 21, a driven sprocket 311a attached to an input shaft 311 of a planetary gear mechanism 31 to be described later on the same plane as the drive sprocket 21a, and the power transmission chain 40 wound around the drive sprocket 21a and the driven sprocket 311a. The driven sprocket 311a has a larger diameter than the drive sprocket 21a, and the number of teeth of the driven sprocket 311a is larger than the number of teeth of the drive sprocket 21a.

Figure 4:
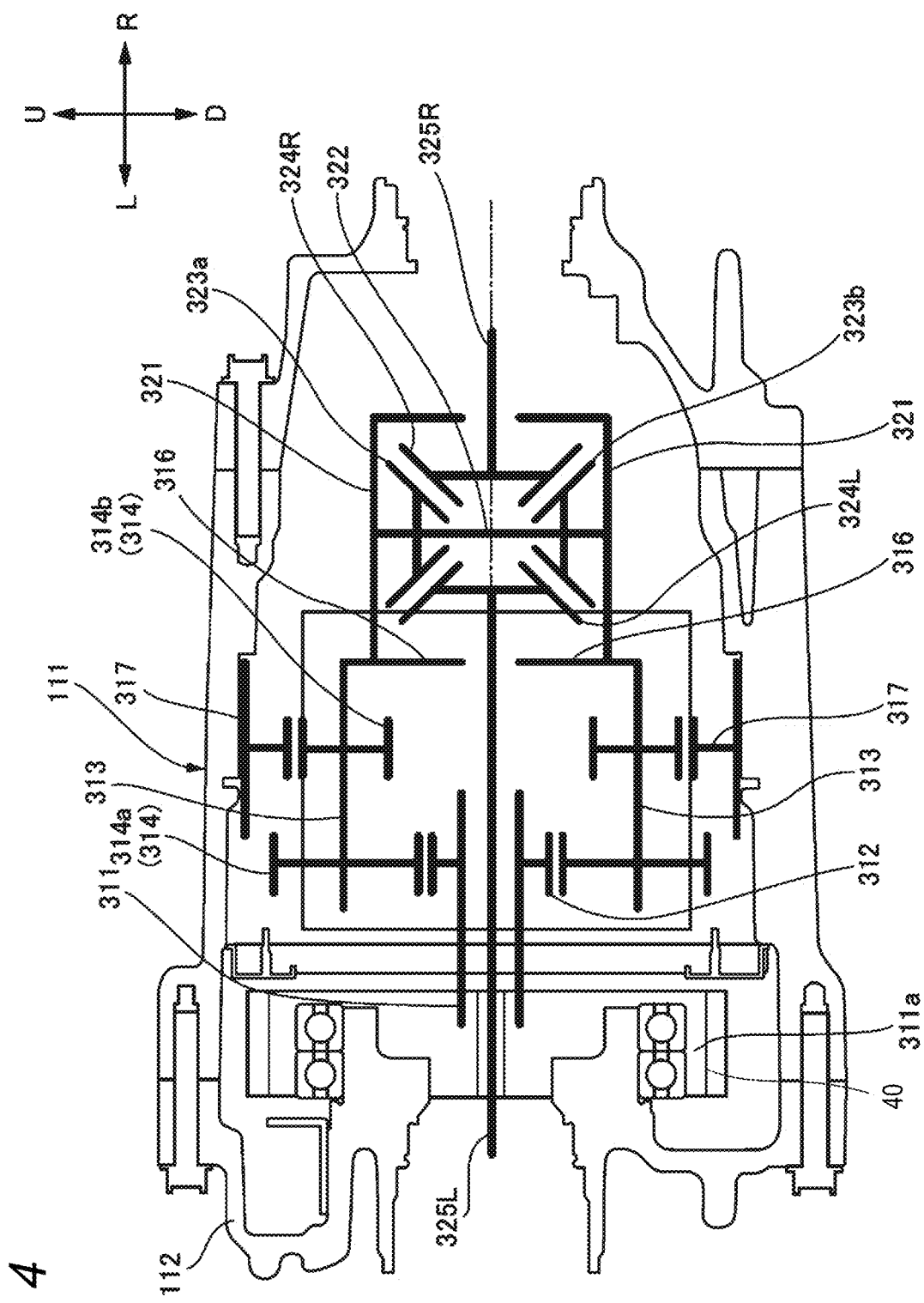
FIG. 4 is a skeleton diagram of a deceleration device in the drive unit 10 in FIG. 2.

As shown in FIGS. 3 and 4, the deceleration device 30 includes the planetary gear mechanism 31 and a differential gear mechanism 32.

The planetary gear mechanism 31 includes an input shaft 311, a sun gear 312, a plurality of planetary pinion shafts 313, the same number of stepped pinions 314 as the planetary pinion shafts 313, a planetary carrier 316, and a ring gear 317.

In the present embodiment, the planetary gear mechanism 31 is aligned behind the drive motor 20 in the front-rear direction. The planetary gear mechanism 31 is disposed such that an axial direction (that is, the input shaft 311) is parallel to the axial direction of the drive motor 20 and is oriented in the left-right direction. The input shaft 311 of the planetary gear mechanism 31 is disposed at substantially the same height as the drive shaft 21 of the drive motor 20 in the upper-lower direction. Further, an outer diameter dimension of the planetary gear mechanism 31 is substantially the same dimension as an outer diameter dimension of the drive motor 20, and a height of the drive unit 10 is small in the upper-lower direction.

The input shaft 311 is a hollow shaft into which a left drive shaft 325L to be described later is inserted. The driven sprocket 311a around which the power transmission chain 40 of the chain transmission mechanism 4 is wound is attached to a left end of the input shaft 311. The driven sprocket 311a rotates integrally with the input shaft 311.

The sun gear 312 is an external gear provided on the input shaft 311, and rotates integrally with the input shaft 311 about the same rotation axis.

The plurality of planetary pinion shafts 313 are disposed at equal intervals in a circumferential direction along an outer peripheral surface of the sun gear 312 in a manner of being oriented in the left-right direction parallel to the input shaft 311 on a radial direction outer side of the sun gear 312.

The stepped pinion 314 including a first planetary gear 314a and a second planetary gear 314b that rotate integrally is pivotally supported by each planetary pinion shaft 313 in a freely rotatable manner.

Each first planetary gear 314a is an external gear that is disposed on the outer peripheral surface of the sun gear 312 and meshes with the sun gear 312.

Each second planetary gear 314b is an external gear that is disposed on an inner peripheral surface of the ring gear 317 and meshes with the ring gear 317.

The planetary carrier 316 connects the planetary pinion shafts 313. The planetary carrier 316 is rotatable about a rotation axis coaxial with the input shaft 311 (and the sun gear 312) integrally with the planetary pinion shafts 313.

Therefore, the stepped pinion 314 including the first planetary gear 314a and the second planetary gear 314b is freely rotatable about the planetary pinion shaft 313 as an axis, and is freely revolvable about the rotation axis coaxial with the input shaft 311 (and the sun gear 312) integrally with the planetary pinion shaft 313. The planetary carrier 316 rotates integrally with a revolutionary motion of the stepped pinion 314 on the rotation axis coaxial with the input shaft 311 (and the sun gear 312).

The ring gear 317 is an annular internal gear whose inner peripheral surface meshes with each second planetary gear 314b. In the present embodiment, the ring gear 317 is fixed to the drive unit case 11, and the ring gear 317 does not rotate.

The differential gear mechanism 32 includes a differential case 321, a differential pinion shaft 322 supported by the differential case 321, a first bevel gear 323a and a second bevel gear 323b pivotally supported by the differential pinion shaft 322 in a freely pivotable manner, a left side gear 324L and a right side gear 324R meshing with the first bevel gear 323a and the second bevel gear 323b, and a left drive shaft 325L and a right drive shaft 325R.

The differential case 321 is formed integrally with the planetary carrier 316 of the planetary gear mechanism 31. Therefore, the differential case 321 rotates about the rotation axis coaxial with the input shaft 311 integrally with the planetary carrier 316 of the planetary gear mechanism 31.

Next, a power transmission path of power output from the drive motor 20 will be described.

Power generated by the drive motor 20 is output from the drive shaft 21, and the drive sprocket 21a attached to the drive shaft 21 rotates integrally with the drive shaft 21. When the drive sprocket 21a rotates, the driven sprocket 311a rotates due to the power transmission chain 40 wound around the drive sprocket 21a and the driven sprocket 311a attached to the input shaft 311 of the planetary gear mechanism 31. The input shaft 311 of the planetary gear mechanism 31 rotates integrally with the driven sprocket 311a. At this time, since the number of teeth of the driven sprocket 311a is larger than the number of teeth of the drive sprocket 21a, the rotation of the drive shaft 21 is reduced via the drive sprocket 21a, the power transmission chain 40, and the driven sprocket 311a, and is input to the input shaft 311 of the planetary gear mechanism 31.

In the planetary gear mechanism 31, the power input to the input shaft 311 is transmitted to the stepped pinion 314 via the sun gear 312. The stepped pinion 314 rotates while revolving. The planetary carrier 316 rotates integrally with the revolution of the stepped pinion 314. In the planetary gear mechanism 31, since the ring gear 317 is fixed, the rotation of the input shaft 311 is reduced at a predetermined reduction ratio and transmitted to the planetary carrier 316.

In the differential gear mechanism 32, the differential case 321 is formed integrally with the planetary carrier 316 of the planetary gear mechanism 31, and thus rotates integrally with the rotation of the planetary carrier 316. Therefore, the power input to the input shaft 311 of the planetary gear mechanism 31 is reduced at the predetermined reduction ratio and input to the differential case 321 via the planetary carrier 316.

Therefore, the power output from the drive shaft 21 is input to the differential case 321 of the differential gear mechanism 32 via the power transmission chain 40 and the planetary gear mechanism 31, and the differential pinion shaft 322 revolves about the rotation axis of the differential case 321 together with the differential case 321.

When the vehicle V travels straight, there is no rotation difference between the left and right rear wheels RW, and thus the left side gear 324L and the right side gear 324R that mesh with the first bevel gear 323a and the second bevel gear 323b rotate according to rotation of the differential pinion shaft 322. The left rear wheel RW rotates when the left drive shaft 325L rotates integrally with the rotation of the left side gear 324L, and the right rear wheel RW rotates when the right drive shaft 325R rotates integrally with the rotation of the right side gear 324R.

When the vehicle V turns, the differential pinion shaft 322 revolves, the first bevel gear 323a and the second bevel gear 323b rotate such that a rotation speed of the rear wheel RW on an inner side during turning decreases whereas a rotation speed of the rear wheel RW on an outer side during turning increases, and meanwhile, the left side gear 324L and the right side gear 324R that mesh with the first bevel gear 323a and the second bevel gear 323b rotate at different rotation speeds such that the rotation speed of the rear wheel RW on the inner side during turning decreases whereas the rotation speed of the rear wheel RW on the outer side during turning increases. The left rear wheel RW rotates when the left drive shaft 325L rotates integrally with the rotation of the left side gear 324L, and the right rear wheel RW rotates when the right drive shaft 325R rotates integrally with the rotation of the right side gear 324R. Therefore, when the vehicle V turns, the left drive shaft 325L and the right drive shaft 325R rotate such that the rotation speed of the rear wheel RW on the inner side during turning decreases whereas the rotation speed of the rear wheel RW on the outer side during turning increases.

In this way, as indicated by arrows in FIG. 3, the power output from the drive motor 20 is reduced via the drive sprocket 21a, the driven sprocket 311a, and the power transmission chain 40, then is input to the deceleration device 30, is further reduced by the planetary gear mechanism 31, and the power is appropriately distributed and transmitted to the left and right rear wheels RW by the differential gear mechanism 32.

Next, the chain chamber 14 and the parking mechanism 6 disposed in the chain chamber 14 will be described.

Figure 5:
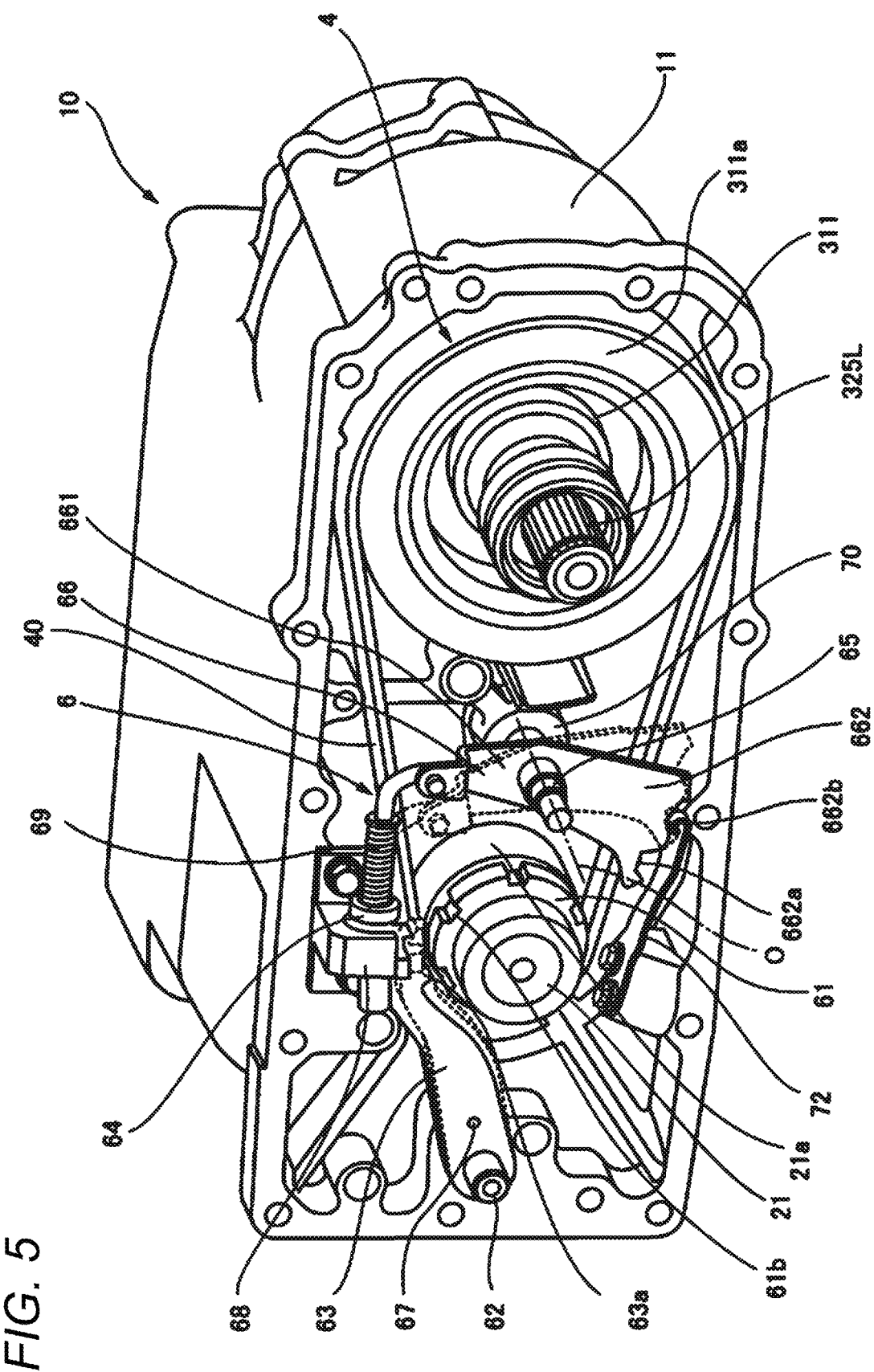
FIG. 5 is a perspective view showing an internal structure of a chain chamber 14.

As shown in FIG. 5, the chain chamber 14 is a space formed by assembling a partition wall provided at the main case 111 and a recess provided in the left side cover 112 in a manner of facing each other. In the chain chamber 14, the drive sprocket 21a attached to the drive shaft 21 is disposed on the front side, the driven sprocket 311a attached to the input shaft 311 of the planetary gear mechanism 31 is disposed on the rear side, and the power transmission chain 40 is wound around the drive sprocket 21a and the driven sprocket 311a.

The parking mechanism 6 includes a parking gear 61, a parking shaft 62, a parking pole 63, a parking rod 64, a control shaft 65, and a detent lever 66.

The parking gear 61 is interposed in the power transmission path in the drive unit 10, and transitions between a locked state of being engaged with the parking pole 63 and preventing rotation, and an unlocked state of not being engaged with the parking pole 63 and allowing rotation. The parking mechanism 6 enters a parking state in which the power transmission path of the drive unit 10 is braked when the parking gear 61 is brought into the locked state, and enters a non-parking state in which the power transmission path of the drive unit 10 is not braked when the parking gear 61 is brought into the unlocked state.

The parking gear 61 is disposed in a manner of being rotatable integrally with the drive shaft 21 of the drive motor 20. Accordingly, a degree of freedom in layout of the parking gear 61 and the parking mechanism 6 can be improved, and the parking gear 61 can be disposed without increasing a size of the drive unit 10 even when there is no space for disposing the parking gear 61 downstream of the drive shaft 21 of the drive motor 20.

The parking gear 61 is disposed at a position different from that of the drive sprocket 21a in a rotation axis direction of the drive shaft 21 of the drive motor 20. Specifically, at the drive shaft 21 of the drive motor 20, the parking gear 61 is disposed on a tip end side (left side) of the drive shaft 21 relative to the drive sprocket 21a. Accordingly, interference between the parking gear 61 and the drive sprocket 21a and interference between the parking gear 61 and the power transmission chain 40 can be prevented.

The parking shaft 62 is supported by the drive unit case 11 and has a rotation axis parallel to the rotation axis of the drive shaft 21 of the drive motor 20.

The parking pole 63 is supported in a manner of being swingable about the parking shaft 62, and swings on the same plane as the parking gear 61. The parking pole 63 includes an engagement claw portion 63a at a tip end thereof, and transitions between an engaged state of being engaged with an engagement groove portion 61b of the parking gear 61 and a disengaged state of not being engaged with the engagement groove portion 61b of the parking gear 61. A pole spring 67 is disposed between the parking pole 63 and the drive unit case 11, and the parking pole 63 is biased by the pole spring 67 to be in the disengaged state.

The parking rod 64 is supported by the drive unit case 11 via a parking rod holder 68 in a manner of being movable forward and backward, and moves forward and backward on the same plane as the parking gear 61. The parking rod 64 moves forward and backward between an advance position where the parking pole 63 is pressed such that the parking pole 63 is brought into the engaged state and a retreat position where the parking rod 64 is separated from the parking pole 63 such that the parking pole 63 is brought into the disengaged state. A rod spring 69 is disposed between the parking rod 64 and the parking rod holder 68, and the parking rod 64 is biased by the rod spring 69 so as to be located at the retreat position.

The control shaft 65 has a rotation axis parallel to the rotation axis of the drive shaft 21 of the drive motor 20, and is rotatably supported by the drive unit case 11 via a support boss 70. The control shaft 65 is connected to a parking operation tool (not shown) and rotates in response to an operation on the parking operation tool. An arrangement of the control shaft 65 will be described later.

The detent lever 66 is supported to be integrally rotatable with the control shaft 65 and swings on the same plane as the parking gear 61. The detent lever 66 swings between a first position where the parking rod 64 is moved to the advance position and a second position where the parking rod 64 is moved to the retreat position according to rotation of the control shaft 65. Accordingly, the parking mechanism 6 can be switched between the parking state and the non-parking state according to an operation on the parking operation tool.

The detent lever 66 includes a first extending portion 661 that extends in an orthogonal direction from a rotation axis and is connected to the parking rod 64, and a second extending portion 662 that extends from the rotation axis in a direction opposite to the first extending portion 661 and engages with a detent spring 72. The second extending portion 662 has at least two detent grooves 662a and 662b arranged in a swinging direction of the detent lever 66, the detent lever 66 is held at the first position by engagement between the first detent groove 662a and the detent spring 72, and the detent lever 66 is held at the second position by engagement between the second detent groove 662b and the detent spring 72.

Next, the arrangement of the control shaft 65 will be further described with reference to FIGS. 6 to 10.

Figure 6:
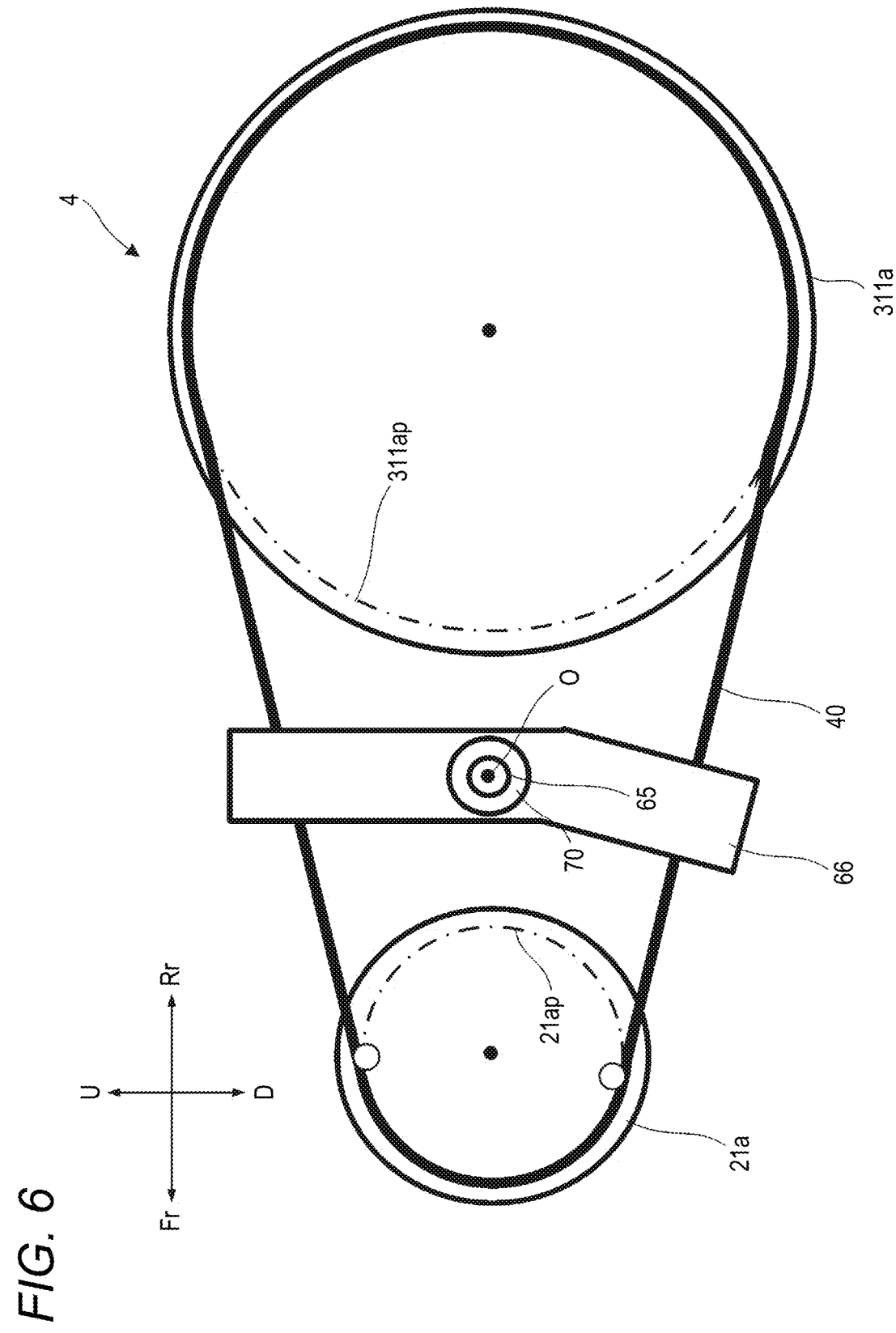
FIG. 6 is a side view schematically showing a part of a chain transmission mechanism 4 and a parking mechanism 6.

As schematically shown in FIG. 6, the control shaft 65 is disposed in the power transmission chain 40 when viewed in the rotation axis direction of the drive shaft 21 of the drive motor 20. That is, the control shaft 65 is disposed in a region surrounded by the power transmission chain 40. In this way, the control shaft 65 can be disposed in the power transmission chain 40 which tends to be a dead space, and the drive unit 10 can be downsized.

Figure 7:
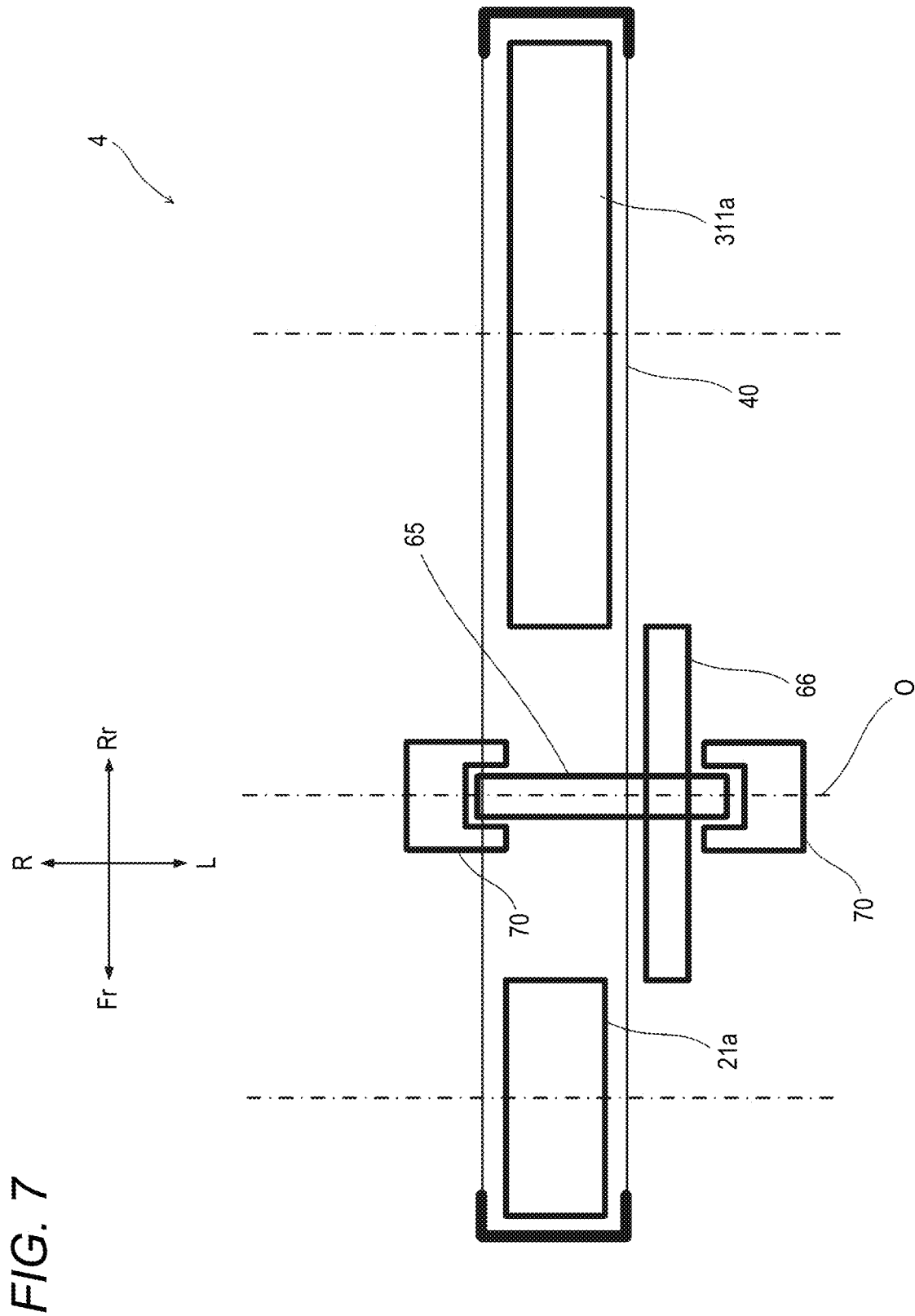
FIG. 7 is a plan view schematically showing a part of the chain transmission mechanism 4 and the parking mechanism 6.

However, in the power transmission chain 40, in order to perform appropriate power transmission, a clearance that allows appropriate swinging between the sprockets 21a and 311a is set. Therefore, when the control shaft 65 is disposed in the power transmission chain 40, the swinging power transmission chain 40 may come into contact with the support boss 70 that supports the control shaft 65. Although it is conceivable to dispose the support boss 70 at a shifted position where the power transmission chain 40 is not interfered with in the rotation axis direction (left-right direction), in order to reduce the size of the drive unit 10, as shown in FIG. 7, there may be a case where the support boss 70 necessarily overlaps the power transmission chain 40 when viewed from above at least on one side (the right side in the present embodiment).

In the drive unit 10 of the present embodiment, an arrangement condition of the control shaft 65 (support boss 70) is set in order to prevent the power transmission chain 40 that swings when the control shaft 65 is disposed in the power transmission chain 40 from coming into contact with the support boss 70 that supports the control shaft 65. First, an example of the arrangement condition will be described with reference to FIG. 8, and another example of the arrangement condition will be described with reference to FIGS. 9 and 10. Broken lines in FIGS. 8 and 9 show a state in which an upper part of the power transmission chain 40 swings to an innermost side.

An example of the arrangement condition includes a first condition and a second condition as conditions to be simultaneously satisfied.

Figure 8:
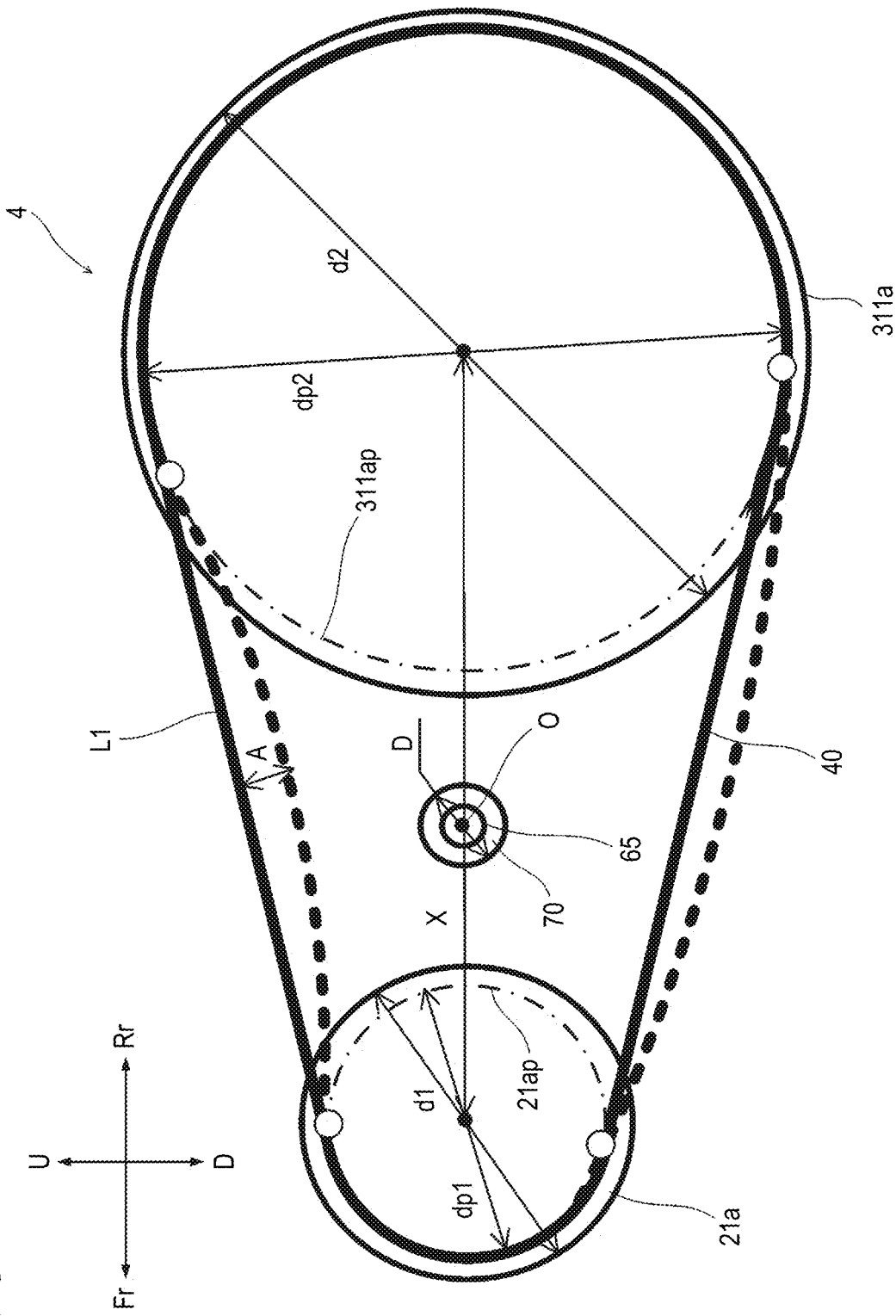
FIG. 8 is a schematic diagram of the chain transmission mechanism 4 showing an example of an arrangement condition of a control shaft 65.
Figure 9:
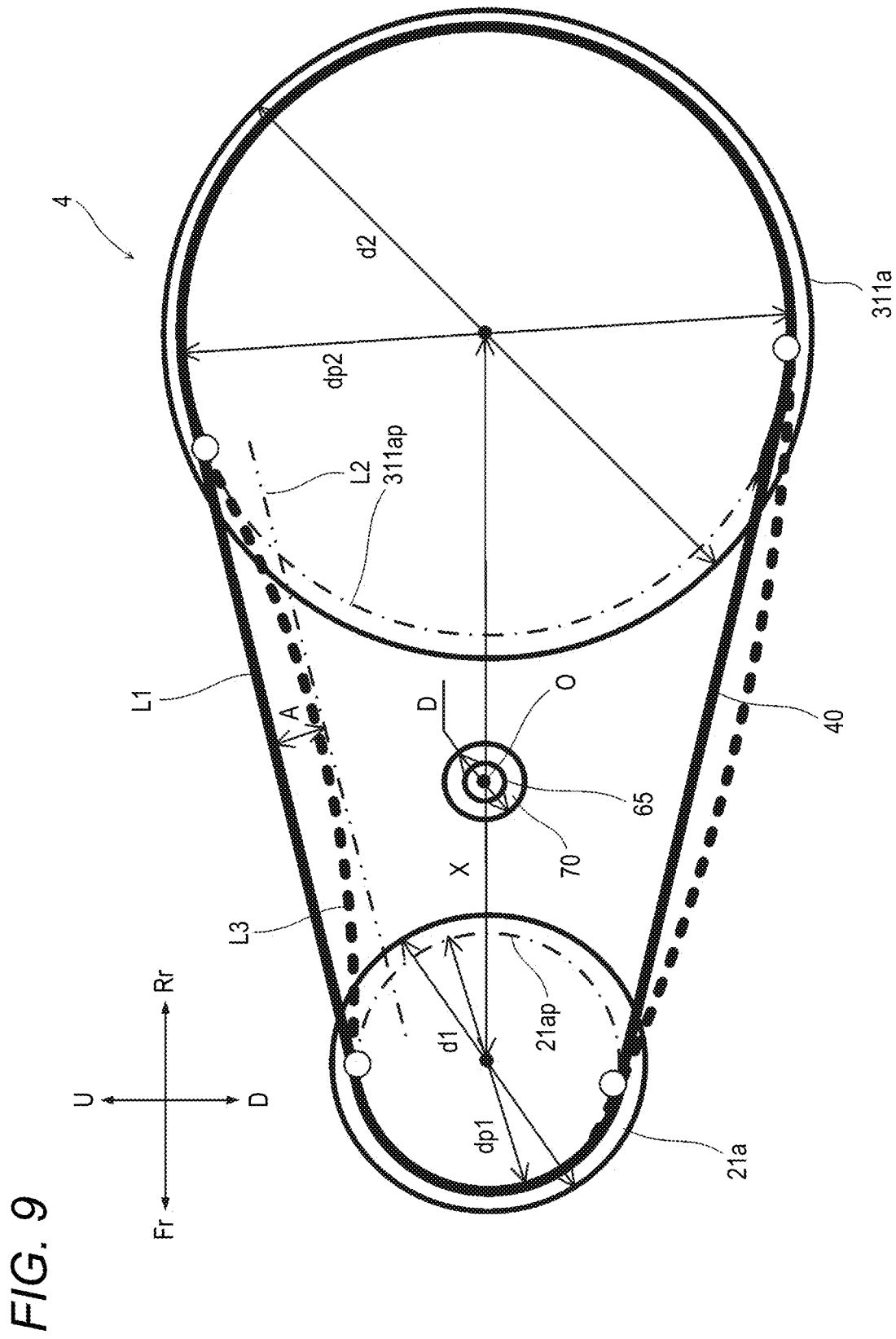
FIG. 9 is a schematic diagram of the chain transmission mechanism 4 showing another example of the arrangement condition of the control shaft 65.

As shown in FIG. 8, the first condition is that $D < X - (d1 + d2)/2$,
where D is a diameter of the support boss 70 of the control shaft 65, X is an axial distance between the drive sprocket 21a (the drive shaft 21 of the drive motor 20) and the driven sprocket 311a (the input shaft 311 of the planetary gear mechanism 31), d1 is a diameter of the drive sprocket 21a, and d2 is a diameter of the driven sprocket 311a.

By satisfying the first condition, the support boss 70 can be disposed between the shafts of the drive sprocket 21a and the driven sprocket 311a without interfering with the drive sprocket 21a and the driven sprocket 311a. The axial distance refers to a distance between axial centers, and the diameters of the sprockets 21a and 311a each refer to a distance to an outermost peripheral surface passing through each axial center.

As shown in FIG. 8, the second condition is that a rotation axis O of the control shaft 65 is disposed in a region at a distance longer than $D/2 + A$ from a circumferential line L1 connecting a chain track innermost diameter circle 21ap (a circle having a diameter dp1) of the drive sprocket 21a and a chain track innermost diameter circle 311ap (a circle having a diameter dp2) of the driven sprocket 311a, where A is a swing amplitude of the power transmission chain 40. The chain track innermost diameter circles 21ap and 311ap are lines (circles) connecting innermost diameter portions of the power transmission chain 40 engaged with the sprockets 21a and 311a.

By satisfying the second condition, it is possible to avoid contact of the power transmission chain 40 with the support boss 70 even when the power transmission chain 40 swings and passes as far inward as possible.

On the other hand, another example of the arrangement condition includes the above-described first condition and a third condition different from the above-described second condition as conditions to be simultaneously satisfied.

As shown in FIG. 9, the third condition is that the rotation axis O of the control shaft 65 is disposed in a region at a distance longer than $D/2$ from an arc L3 that is tangent to three lines, that is, a parallel line L2 that is A away on the support boss 70 side from the circumferential line L1 common to the chain track innermost diameter circle 21ap of the drive sprocket 21a and the chain track innermost diameter circle 311ap of the driven sprocket 311a, the chain track innermost diameter circle 21ap of the drive sprocket 21a, and the chain track innermost diameter circle 311ap of the driven sprocket 311a, where A is the swing amplitude of the power transmission chain 40. The arc L3 is substantially equal to a trajectory of the power transmission chain 40 that swings to the innermost side.

Figure 10:
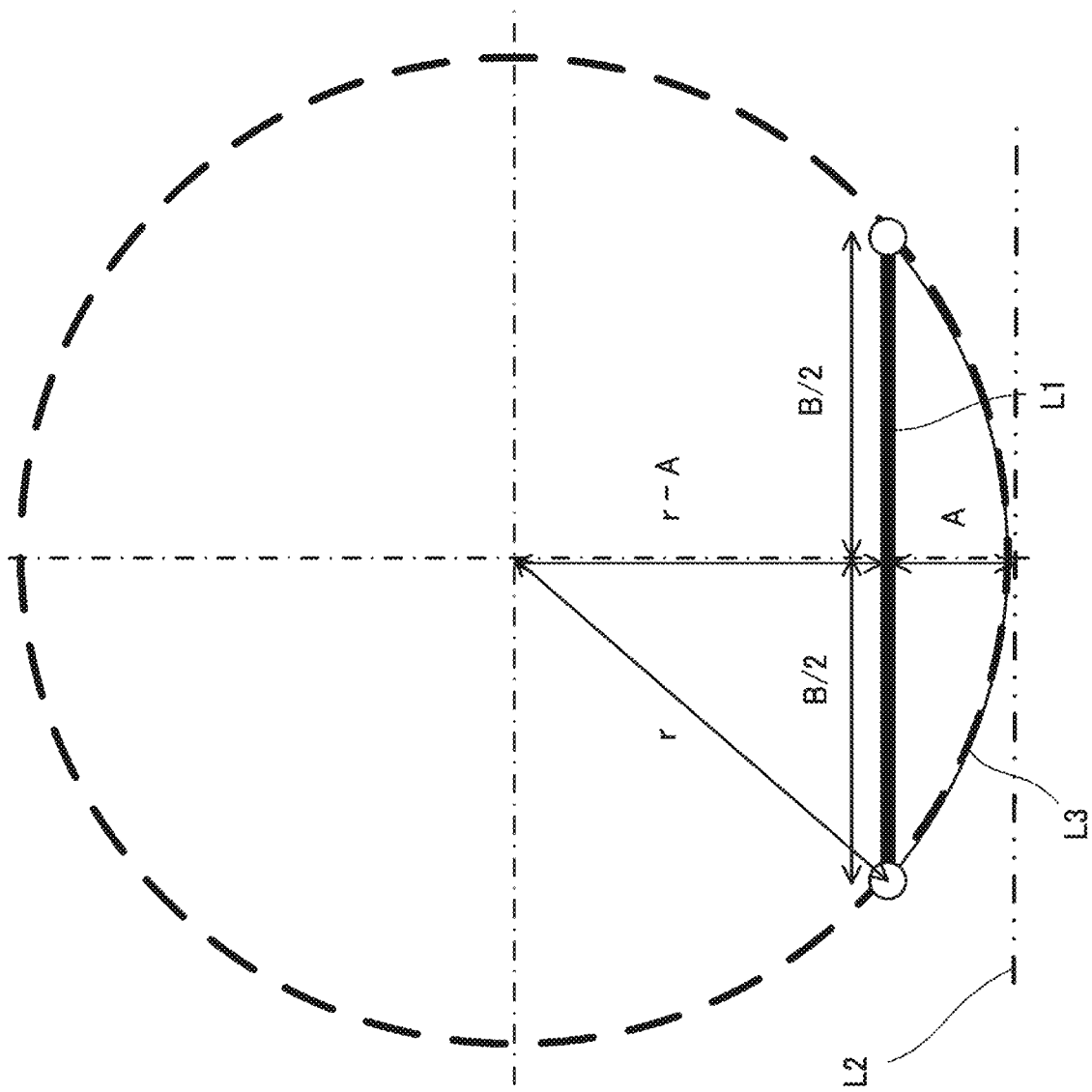
FIG. 10 is an explanatory diagram of a calculation formula for calculating a radius of an arc L3 shown in FIG. 9.

A radius r of the arc L3 can be calculated using the following formula. As shown in FIG. 10, the following formula (1) is valid, where B is a distance between contact points of the circumferential line L1 common to the chain track innermost diameter circle 21ap of the drive sprocket 21a and the chain track innermost diameter circle 311ap of the driven sprocket 311a.

$$r^2 = (r-A)^2 + (B/2)^2 \tag{1}$$

When this formula is expanded, the following formula (2) for obtaining the radius r of the arc L3 based on the swing amplitude A and the distance B between the contact points of the circumferential line L1 is obtained. The swing amplitude A and the distance B between the contact points of the circumferential line L1 are values determined by the diameters of the drive sprocket 21a and the driven sprocket 311a, the axial distance between the drive sprocket 21a and the driven sprocket 311a, and a length and properties of the power transmission chain 40.

$$r=(A/2)+(B^2/8A) \tag{2}$$

By satisfying the third condition, it is possible to avoid contact of the power transmission chain 40 with the support boss 70 even when the power transmission chain 40 swings and passes as far inward as possible.

Although the embodiment of the present invention has been described above with reference to the accompanying drawings, it is needless to say that the present invention is not limited to the embodiment. It is apparent that those skilled in the art can conceive of various modifications and alterations within the scope described in the claims, and it is understood that such modifications and alterations naturally fall within the technical scope of the present invention. In addition, the constituent elements in the above embodiment may be freely combined without departing from the gist of the invention.

For example, the power transmission chain 40 is shown as an example of the endless flexible member, but the endless flexible member is not limited thereto, and may be a belt.

In this specification, at least the following matters are described. Although corresponding constituent elements or the like in the embodiment described above are shown in parentheses, the present invention is not limited thereto.

(1) A power transmission device (drive unit 10) including:
a drive source (drive motor 20);
a transmission portion (chain transmission mechanism 4) configured to convert power of the drive source and transmit the power to a driven portion; and
a case (drive unit case 11) accommodating the drive source and the transmission portion, in which
the power transmission device further includes
a drive sprocket (drive sprocket 21a) disposed at an output shaft (drive shaft 21) of the drive source,
a driven sprocket (driven sprocket 311a) disposed on the same plane as the drive sprocket,
an endless flexible member (power transmission chain 40) wound around the drive sprocket and the driven sprocket, and
a parking gear (parking gear 61) disposed at the output shaft of the drive source.

According to (1), a degree of freedom in layout of the parking gear is improved.

(2) The power transmission device according to (1), in which
the parking gear is disposed at a position different from that of the drive sprocket in a rotation axis direction of the output shaft of the drive source.

According to (2), interference with the drive sprocket can be prevented.

(3) The power transmission device according to (1), further including:
a parking shaft (parking shaft 62) having a rotation axis parallel to a rotation axis of the output shaft of the drive source; and
a parking pole (parking pole 63) supported by the parking shaft and swingable on a same plane as the parking gear, in which
the parking pole
is configured to transition between an engaged state of being engaged with the parking gear and a disengaged state of not being engaged with the parking gear, and
is biased to be in the disengaged state.

According to (3), the driven portion can be maintained in a parking state by engaging the parking pole with the parking gear.

(4) The power transmission device according to (3), further including:
a parking rod (parking rod 64) movable forward and backward on the same plane as the parking gear, in which
the parking rod
is configured to move between an advance position where the parking rod is capable of pressing the parking pole and a retreat position away from the parking pole, and
is biased to be located at the retreat position.

According to (4), the position of the parking pole can be controlled by the parking rod.

(5) The power transmission device according to (4), further including:
a control shaft (control shaft 65) having a rotation axis parallel to the rotation axis of the output shaft of the drive source; and
a detent lever (detent lever 66) supported by the control shaft and swingable on the same plane as the parking gear, in which
the detent lever
is configured to swing between a first position getting the parking rod moved to the advance position and a second position getting the parking rod moved to the retreat position, and
is biased to be located at the second position.

According to (5), the position of the parking rod can be controlled by the detent lever.

(6) The power transmission device according to (5), in which
the control shaft is disposed inside the endless flexible member when viewed in the rotation axis direction of the output shaft of the drive source.

According to (6), since the control shaft is disposed in the endless flexible member which tends to be a dead space, a drive device can be downsized.

(7) The power transmission device according to (6), further including:
a support boss (support boss 70) provided at the case and supporting the control shaft, in which
a relationship of $D<X-(d1+d2)/2$ is satisfied, where
D is a diameter of the support boss of the control shaft,
X is a distance between the output shaft of the drive source and a rotation shaft (input shaft 311) of the driven sprocket,
d1 is a diameter of the drive sprocket, and
d2 is a diameter of the driven sprocket, and
a rotation axis (rotation axis O) of the control shaft is disposed in a region at a distance longer than $D/2+A$ from an external tangential line (circumferential line L1) common to a chain track innermost diameter circle (chain track innermost diameter circle 21ap) of the drive sprocket and a chain track innermost diameter circle (chain track innermost diameter circle 311$ap$) of the driven sprocket, where A is a swing amplitude of the endless flexible member.

According to (7), even when the control shaft is disposed in the endless flexible member, the endless flexible member can be prevented from coming into contact with the support boss that supports the control shaft.

(8) The power transmission device according to (6), further including:

a support boss (support boss 70) provided at the case and configured to support the control shaft, in which a relationship of $D<X-(d1+d2)/2$ is satisfied, where D is a diameter of the support boss of the control shaft, X is a distance between the output shaft of the drive source and a rotation shaft (input shaft 311) of the driven sprocket, d1 is a diameter of the drive sprocket, and d2 is a diameter of the driven sprocket, and a rotation axis (rotation axis O) of the control shaft is disposed in a region at a distance longer than D/2 from an arc (arc L3) that is tangent to three lines: a parallel line (parallel line L2) that is away by A on a support boss side from an external tangential line common to a chain track innermost diameter circle (chain track innermost diameter circle 21$ap$) of the drive sprocket and a chain track innermost diameter circle (chain track innermost diameter circle 311$ap$) of the driven sprocket; the chain track innermost diameter circle of the drive sprocket; and the chain track innermost diameter circle of the driven sprocket, where A is a swing amplitude of the endless flexible member.

According to (8), even when the control shaft is disposed in the endless flexible member, the endless flexible member can be prevented from coming into contact with the support boss that supports the control shaft.

What is claimed is:

1. A power transmission device comprising:
   a drive source;
   a transmission portion configured to convert power of the drive source and transmit the power to a driven portion; and
   a case accommodating the drive source and the transmission portion, wherein
   the transmission portion includes
      a drive sprocket disposed at an output shaft of the drive source,
      a driven sprocket disposed on a same plane as the drive sprocket, and
      an endless flexible member wound around the drive sprocket and the driven sprocket,
   the power transmission device further comprises:
      a parking gear disposed at the output shaft of the drive source;
      a parking shaft having a rotation axis parallel to a rotation axis of the output shaft of the drive source;
      a parking pole supported by the parking shaft and swingable on a same plane as the parking gear;
      a parking rod movable forward and backward on the same plane as the parking gear;
      a control shaft having a rotation axis parallel to the rotation axis of the output shaft of the drive source; and
      a detent lever supported by the control shaft and swingable on the same plane as the parking gear,
   the parking pole
      is configured to transition between an engaged state of being engaged with the parking gear and a disengaged state of not being engaged with the parking gear, and
      is biased to be in the disengaged state,
   the parking rod
      is configured to move between an advance position where the parking rod is capable of pressing the parking pole and a retreat position away from the parking pole, and
      is biased to be located at the retreat position,
   the detent lever
      is configured to swing between a first position getting the parking rod moved to the advance position and a second position getting the parking rod moved to the retreat position, and
      is biased to be located at the second position, and
   the control shaft is disposed inside the endless flexible member when viewed in the rotation axis direction of the output shaft of the drive source.

2. The power transmission device according to claim 1, wherein
   the parking gear is disposed at a position different from that of the drive sprocket in a rotation axis direction of the output shaft of the drive source.

3. The power transmission device according to claim 1, further comprising:
   a support boss provided at the case and supporting the control shaft, wherein
   a relationship of $D<X-(d1+d2)/2$ is satisfied, where
      D is a diameter of the support boss of the control shaft,
      X is a distance between the output shaft of the drive source and a rotation shaft of the driven sprocket,
      d1 is a diameter of the drive sprocket, and
      d2 is a diameter of the driven sprocket, and
   a rotation axis of the control shaft is disposed in a region at a distance longer than D/2+A from an external tangential line common to a chain track innermost diameter circle of the drive sprocket and a chain track innermost diameter circle of the driven sprocket,
   where A is a swing amplitude of the endless flexible member.

4. The power transmission device according to claim 1, further comprising:
   a support boss provided at the case and configured to support the control shaft, wherein
   a relationship of $D<X-(d1+d2)/2$ is satisfied, where
      D is a diameter of the support boss of the control shaft,
      X is a distance between the output shaft of the drive source and a rotation shaft of the driven sprocket,
      d1 is a diameter of the drive sprocket, and
      d2 is a diameter of the driven sprocket, and
   a rotation axis of the control shaft is disposed in a region at a distance longer than D/2 from an arc that is tangent to three lines: a parallel line that is away by A on a support boss side from an external tangential line common to a chain track innermost diameter circle of the drive sprocket and a chain track innermost diameter circle of the driven sprocket; the chain track innermost diameter circle of the drive sprocket; and the chain track innermost diameter circle of the driven sprocket,
   where A is a swing amplitude of the endless flexible member.

* * * * *